US012625664B2

(12) United States Patent
Ramasamy et al.

(10) Patent No.: US 12,625,664 B2
(45) Date of Patent: May 12, 2026

(54) CONFERENCING SOLUTIONS FOR MULTI-MONITOR AWARE IMMERSIVE COLLABORATION EXPERIENCE

(71) Applicant: Dell Products L.P., Round Rock, TX (US)

(72) Inventors: Sudhakar Ramasamy, Salem (IN); Ramanujam Kaniyar Venkatesh, Bangalore (IN); Jayaprakash K, Trichy (TN); Nanda Kumar S, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/783,490

(22) Filed: Jul. 25, 2024

(65) Prior Publication Data

US 2026/0029977 A1      Jan. 29, 2026

(51) Int. Cl.
　*G06F 3/14* 　　　(2006.01)
　*H04N 7/15* 　　　(2006.01)
(52) U.S. Cl.
　CPC ............. *G06F 3/1423* (2013.01); *H04N 7/15* (2013.01)
(58) Field of Classification Search
　CPC ................................ G06F 3/1423; H04N 7/15
　See application file for complete search history.

(56) References Cited

U.S. PATENT DOCUMENTS

| | | | |
|---|---|---|---|
| 7,289,964 B1 * | 10/2007 | Bowman-Amuah | ........................ G06F 9/5038 705/1.1 |
| 2009/0006632 A1 * | 1/2009 | Ramanathan | ....... H04M 3/2218 709/228 |
| 2016/0026358 A1 * | 1/2016 | Stewart | ............... G06F 3/04883 715/781 |
| 2022/0200819 A1 * | 6/2022 | Kasso | ................. H04L 12/4625 |

* cited by examiner

*Primary Examiner* — Robert J Michaud
(74) *Attorney, Agent, or Firm* — Jackson Walker L.L.P.

(57) ABSTRACT

Disclosed methods and systems for multi-monitor aware collaboration assist tools provide immersive collaboration and an improved participant experience. Disclosed collaboration assist systems and methods may implement a middle application layer running on an electron.js run time, or another suitable runtime framework. In at least one embodiment, collaboration assist tools may include collaboration assist components including, as non-limiting examples, a collaboration assistant streaming service, a content sharing controller (CSC), and a view manager (VM). In at least some embodiments, the CA components may be installed as system software on endpoints for a multi monitor aware collaboration experience with UC Apps.

12 Claims, 3 Drawing Sheets

300

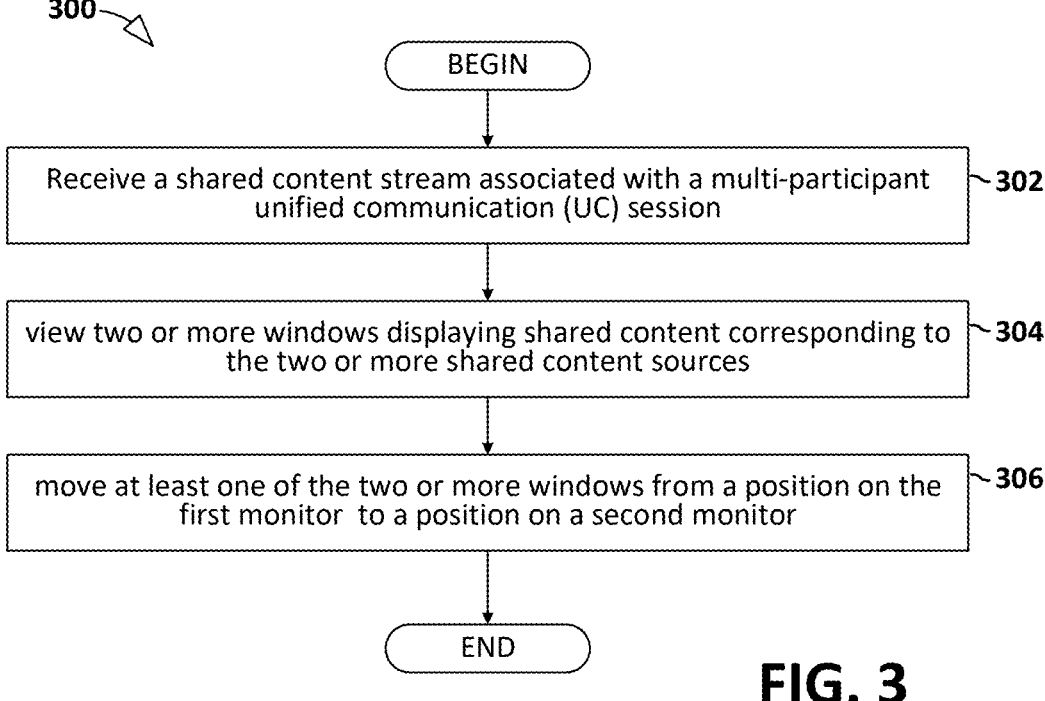

BEGIN

Receive a shared content stream associated with a multi-participant unified communication (UC) session — 302 view two or more windows displaying shared content corresponding to the two or more shared content sources — 304 move at least one of the two or more windows from a position on the first monitor to a position on a second monitor — 306

END

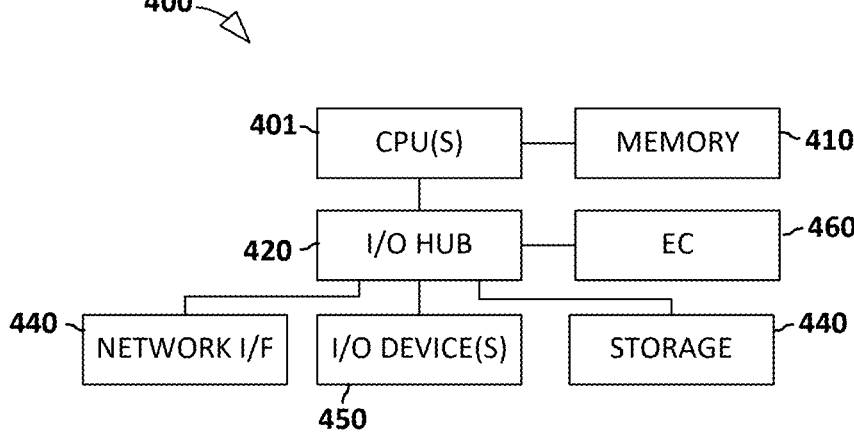

401 — CPU(S) — MEMORY — 410

420 — I/O HUB — EC — 460

440 — NETWORK I/F    I/O DEVICE(S)    STORAGE — 440

CONFERENCING SOLUTIONS FOR MULTI-MONITOR AWARE IMMERSIVE COLLABORATION EXPERIENCE

TECHNICAL FIELD

The present disclosure pertains to video conferencing and collaboration tools.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured for use as video conferencing, and collaboration clients such as Zoom, Teams, and similar applications, many of which achieved rapid and global recognition in 2020 during the COVID-19 pandemic, have since evolved into essential communication and teamwork tools. Client side conferencing and collaboration tools, collectively referred to herein as unified communication (UC) tools and/or UC clients, enable substantially any two or more people to connect from disparate and potentially remote locations to facilitate seamless sharing and collaboration.

In parallel with the rapid and pervasive emergence of UC clients, the prevalence of desktop and laptop configurations featuring two or more display monitors has increased dramatically. Such multi-monitor configurations are heavily utilized in the workplace and other environments for multitasking, creative design work, comfort, data analysis, and a wide variety of other use cases. Multi-monitor workstations can significantly enhance productivity and improve the overall work experience, especially when sharing work and collaborating with stakeholders is critical.

Unfortunately, existing UC tools lack the capability to provide an immersive experience for users to share applications across multiple displays or share applications across multiple monitors simultaneously during collaboration sessions. These limitations can hinder effective collaboration and create a less productive work environment, particularly for individuals who need to collaborate on multiple applications or view data on multiple screens. Consider, as an example, a first user (User1), working on a 2-monitor workstation, who joins a UC application session with a second user (User2). User2 shares two applications with User1 for collaboration. Conventional UC tools, which do not take into account the number of monitors being used by User1, display the two applications by User2 as a single window to User1. As a result, not only is the displayed text likely to be smaller for User1, the overall collaborative and immersive characteristics of the UC session are diminished.

SUMMARY

Previously discussed problems associated with conventional UC applications are addressed by disclosed methods and systems for multi-monitor aware collaboration assist tools for immersive collaboration and an improved participant experience. Disclosed collaboration assist systems and methods may implement a middle application layer running on a JavaScript Electron runtime, also referred to as an electron.js run time, or another suitable runtime framework. In at least one embodiment, collaboration assist tools may include collaboration assist components including, as non-limiting examples, a collaboration assistant streaming service, a content sharing controller (CSC), and a view manager (VM). In at least some embodiments, the CA components may be installed as system software on endpoints for a multi monitor aware collaboration experience with UC Apps.

Disclosed systems and methods may consider a receiving participant's multi-monitor capabilities to allow the shared app/desktop content to be rendered into multiple split windows. Disclosed methods support sharing content from applications, distributed across the multiple monitors, eliminating the need to switch the UC application to the primary monitor by presenter. In addition, disclosed features support a seamless OS/UC App agnostic framework for presenters to share content from multiple monitors simultaneously.

Exemplary use cases where the ability to share applications across multiple displays during remote collaboration sessions would be beneficial include, without limitation:

Software development Developers often work with multiple applications and tools simultaneously and may need to share them with others during team meetings.

Data analysis Data analysts may need to view multiple charts and graphs simultaneously and share them with others during collaboration sessions.

Creative design Designers may use multiple tools such as Photoshop, Illustrator, or other design software simultaneously and may need to share their work with others during collaboration sessions.

Graphic Design and Video Editing Creative professionals can have their design software open on one screen and use the other screen for a preview, references, asset libraries, or communication tools.

Financial Analysis Financial analysts can analyze data on one screen and use the other screens for financial models, real time market data, news feeds, or economic indicators.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

In one aspect, disclosed methods and systems for implementing assisted-UC sessions enabling unrestricted placement of shared content windows in multi-monitor systems may receive a shared content stream associated with a multi-participant UC session. The shared content stream may include content from two or more content sources shared by a first participant via a first information handling system, which may or may not include multiple monitors. In at least some embodiments, the shared content sources include application windows as well as a desktop of the first system. A second participant may join the UC session from a multi-monitor system including a first monitor and a second monitor. In at least one embodiment, the multi-monitor information handling system is configured and enabled to view and move any of two or more windows displaying shared content corresponding to the two or more content sources shared by the first participant. In addition, the functionality enabling the second participant to move shared content windows includes inter-monitor movement functionality enabling the second participant to move any of the shared content window from a position on the first monitor to a position on a second monitor or vice versa.

Disclosed methods and systems may include or otherwise support expanded functionality for providing participants, i.e., participants selecting shared content consumed by receiving participants. As a non-limiting example, the shared content stream of an assisted-UC application may include first shared content corresponding to a first shared window display on a first monitor of the providing participant's system as well as second shared content corresponding to a second shared window displayed on a second monitor of the providing participant's system. Such functionality beneficially improves the immersive experience for the providing participant by enabling the providing participant with multi-monitor systems to share from multiple content sources without regard to which monitor the content source is displayed on, thereby eliminating any limitation restricting the "selectable" content sources to the currently active monitor.

In at least some embodiments, disclosed methods and system implement or support disclosed collaboration assistance functionality with one or more collaboration assist components. At least some of these components may be implemented as client-side components running on an electron.js runtime or another suitable runtime framework. The collaboration assistance components may include a cloud-based or premises-hosted streaming service to stream a shared content stream, natively generated by the applicable UC application, to the second participant via secure web socket connections from a CSC for data transfer, a CSC to receive the shared content stream and initiate data transfer, and a view manager to create multiple windows and render shared content in accordance with a request from the CSC. The streaming service may open multiple parallel shared content streams, each of which may be directed to an appropriate socket and receiving participant as conveyed, for example, by session identifier information or the like.

It is to be understood that both the foregoing general description and the following detailed description are examples and explanatory and are not restrictive of the claims set forth in this disclosure.

BRIEF DESCRIPTION OF THE DRAWINGS

A more complete understanding of disclosed subject matter and advantages thereof may be acquired by referring to the following description taken in conjunction with the accompanying drawings, in which like reference numbers indicate like features, and wherein:

FIG. 3 illustrates a flow diagram of a multi-monitor aware method for assisting a UC session; and FIG. 4 illustrates an exemplary information handling system suitable for use in conjunction with systems and methods disclosed in FIGS. 1-3.

DETAILED DESCRIPTION

Figure 1:
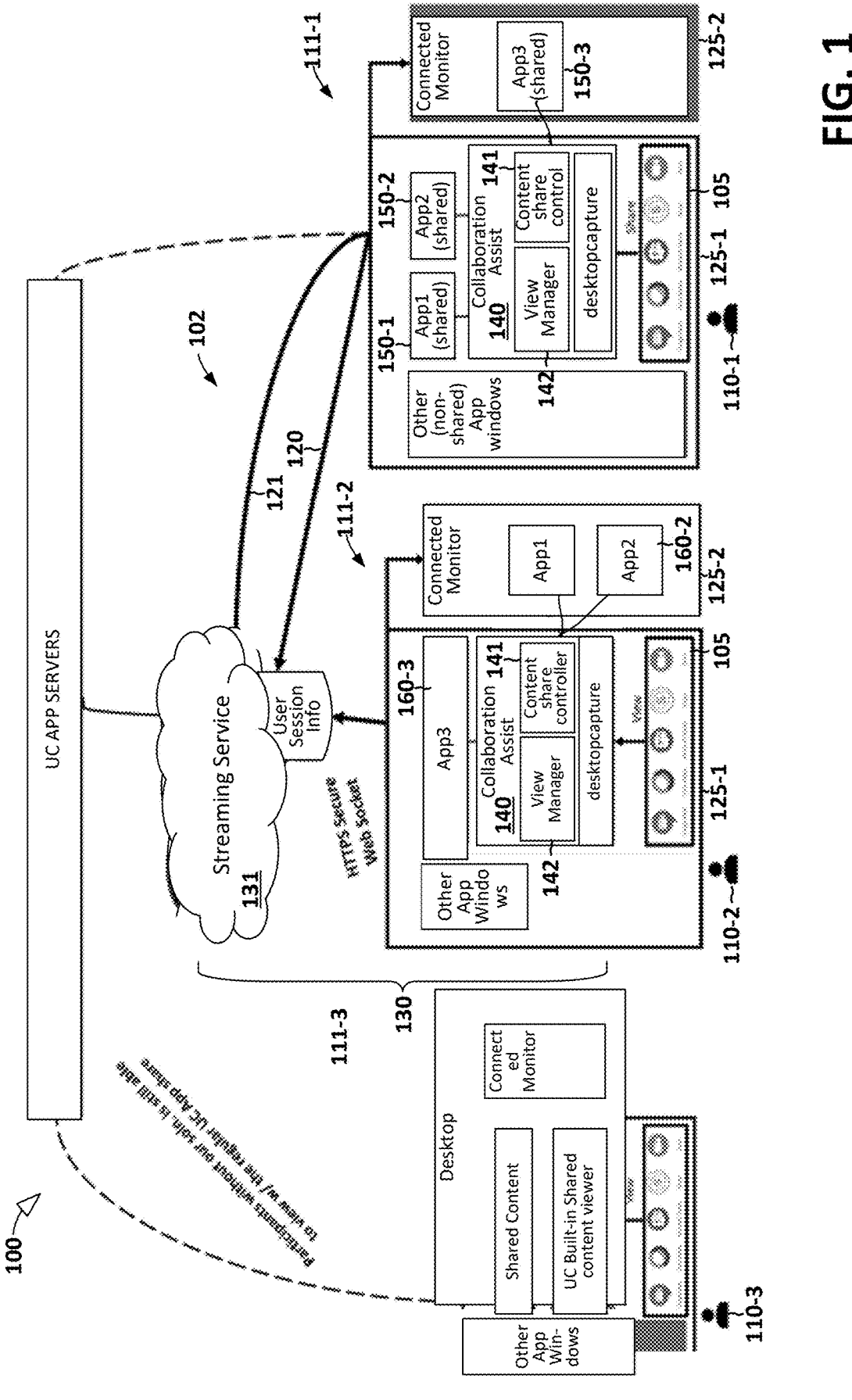
FIG. 1 illustrates an exemplary assisted-UC platform including multi-monitor aware collaboration assistance in accordance with disclosed subject matter.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Turning now to the drawings, FIG. 1 illustrates an exemplary assisted-UC platform 100 in accordance with collaboration assist components 130 disclosed herein to enable or otherwise support multi-monitor aware assistance in conjunction with a multi-participant, assisted-UC session 102 associated with a UC client 105. Although FIG. 1 depicts an assisted-UC session 102 with three participants 110 including first participant 110-1, sometimes referred to herein as the providing participant 110-1, a second participant 110-2, sometimes referred to herein as the receiving participant 110-2, and a third participant 110-3, any number of participants may be present.

In at least some embodiments, collaboration assistance component 130 may provide a middle application layer running on an electron.js runtime or another suitable runtime framework to provide a multi-monitor aware experience for participants 110 who have joined assisted-UC session 102 from suitably enabled and provisioned information handling systems. Collaboration assistance components 130 may be implemented in a UC-agnostic manner to enable support for any of various publically available UC clients including, as non-limiting examples, Microsoft Teams, Zoom, and the like. The collaboration assistance components 130 illustrated in FIG. 1 include a cloud-based streaming service 131 and a client-side collaboration assist module 140 hosting a view manager 142 and a CSC 141.

Streaming service 131 may be configured to send shared content streams 121 from a providing participant, such as first participant 110-1, to one or more receiving participants, such as the second participant 110-2, using secure web socket connections 120 with the CSC 141 of first participant 110-1. Streaming service 131 may also receive, process, and store authentication information included with the shared content data for session identification. Transmitted data can be compressed and encrypted to improve performance and security, respectively. Additionally, disclosed systems may include and/or support authorization standards including, as non-limiting examples, two factor authentication and/or Open Authorization (OAuth 2.0) standard for enabling a website or application to access resources hosted by other web applications on behalf of a user.

The CSC 141 depicted in FIG. 1 may receive shared content natively generated by the UC client 105, authenticate with streaming service 131, and initiate data transfers including shared content transfers. Shared content received by streaming service 131 may be broadcasted to multiple sockets 120 which identify or listen for a socket 120 with a particular session identifier.

The view manager 142 depicted in FIG. 1 may be configured to create multiple windows and render content as requested by CSC 141 upon receiving data from the streaming service 131.

In the exemplary assisted-UC session 102 depicted in FIG. 1, first participant 110-1 is a presenting participant who joined assisted-UC session 102 via a first information handling system 111-1 that includes disclosed collaboration assistance components 130. For the sake of clarity and brevity, information handling systems 111 that support disclosed collaboration assistance may be referred to herein as collaboration-compliant information handling systems or, more simple, compliant systems. A second participant 110-2 of the assisted-UC session 102 is a recipient participant connected to assisted-UC session 102 via a second compliant information handling system. The third participant 110-3 represents a recipient participant connected to assisted-UC session 102 via an information handling system that does not include collaboration assistance disclosed herein. The inclusion of third participant 110-3 reflects a backward compatibility feature of disclosed subject matter wherein a lack of collaboration assistance support does not preclude a system from joining and experiencing a "legacy" UC session.

The first information handling system 110-1 depicted in FIG. 1 includes multiple monitors including a primary monitor 125-1 one and a second monitor 125-2. First participant 110-1 has opened and shared three applications 150 of interest, including a first shared application 150-1 and a second shared application 150-2, both of which are displayed on the primary display 125-1 of first information handing system 111-1. In addition, a third shared application 150-3 is shown displayed on secondary monitor 125-2 of information handling system 111-2. In accordance with collaboration assist functionality disclosed herein, FIG. 1 further illustrates the displayed arrangement of shared content windows 160 on second information handling system 111-2, wherein each shared content window 160 is associated with a corresponding shared application 150. In particular, FIG. 1 illustrates a monitor-aware rendering of the shared content streams in which shared content windows 160-1 and 160-2 corresponding to first and second applications 150-1 and 150-2 respectively are displayed on the monitor secondary monitor 125-2 of second information handling system 111-2 while the shared content window 160-3 corresponding to third shared application 150-3 is displayed on the primary monitor 125-1 of second information handling system 111-2.

In at least some embodiments, disclosed collaboration assistance features have particular utility in conjunction with multi-monitor information handling systems 111. For the assisted-UC session 102 depicted in FIG. 1, first information handling system 111-1 and second information handling system 111-2 are both multi-monitor systems, including a primary monitor 125-1 and a connected monitor 125-2, while third information handling system 111-3 is a single monitor system. In this manner, disclosed collaboration assistance features support multi-monitor aware display autonomy, enabling participants to arrange their display configurations as desired.

Figure 2:
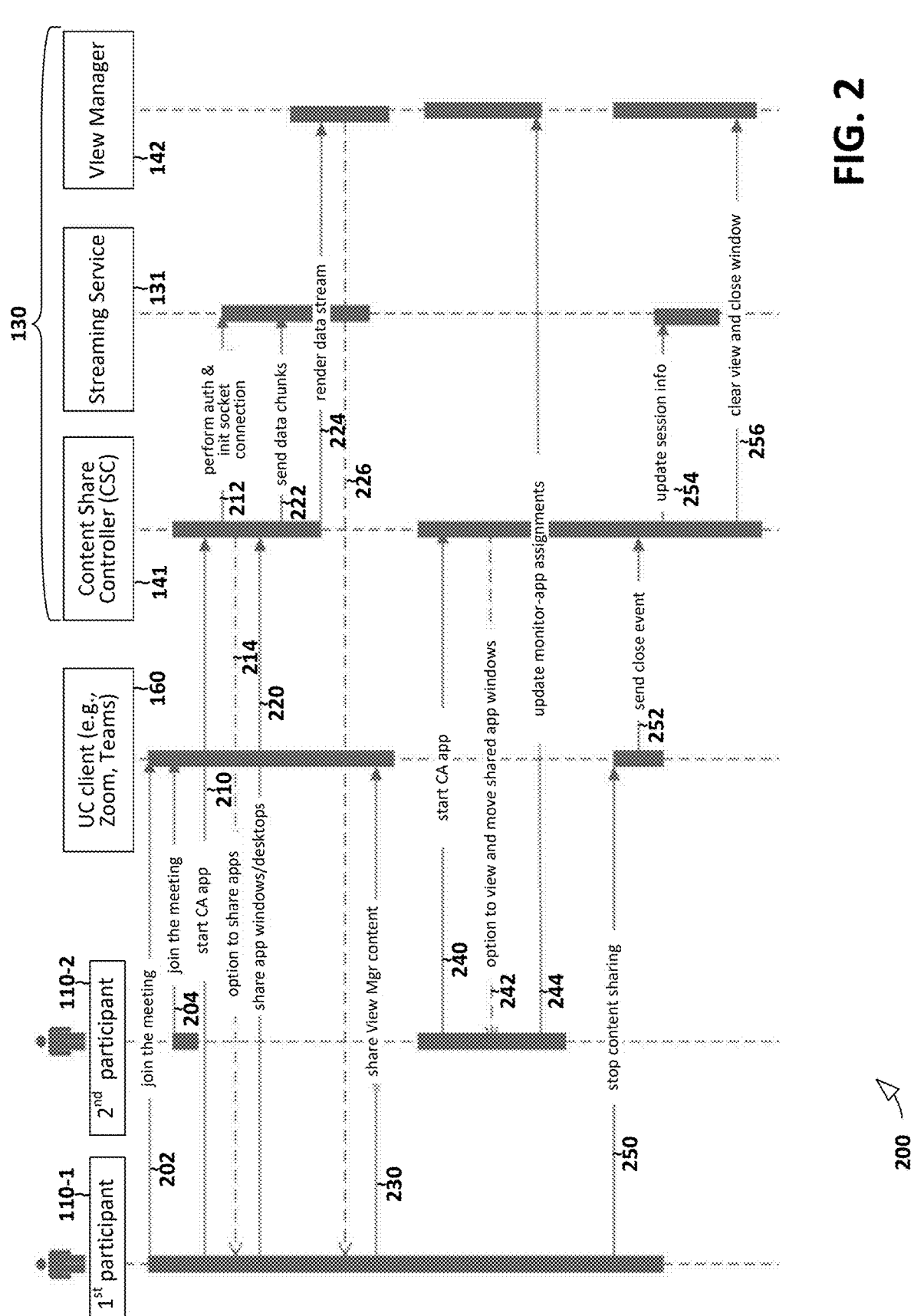
FIG. 2 illustrates a sequence diagram for providing multi-monitor aware assistance to a UC session.

FIG. 2 illustrates a sequence diagram 200 depicting exemplary operations performed to implement collaboration assist features such as the collaboration assistance components 130 disclosed in FIG. 1 and the accompanying description in accordance with disclosed teachings. After the first participant 110-1 and the second participant 110-2 join the UC meeting (operations 202, 204), first participant 110-1 starts (operation 210) the collaboration assist application. In the depicted sequence 200, CSC 141 performs an authorization and initializes (operation 212) a socket connection with streaming service 131. In addition, CSC 141 enables (operation 214) first participant 110-1 to share one or more application windows. FIG. 2 illustrates first participant 110-1 sharing (operation 220) one or more application windows and or desktops.

As depicted in FIG. 2, CSC 141 sends (operation 222) data chunks to streaming service 131. In at least some embodiments, the data chunks exchanged between CSC 141 and streaming service 131 include, in addition to shared content, session metadata such as session ID information and or authorization information.

FIG. 2 further illustrates CSC 141 rendering (operation 224) shared data streams 121 to view manager 142. View manager 142 may then send (operation 226) the view manager content data to first participant 110-1. FIG. 2 still further illustrates first participant 110-1 enabling (operation 230) a feature for sharing view manager content. Second participant 110-2 may then start (operation 240) its DCA application. In response, the illustrated CSC 141 provides functionality enabling first participant 110-1 to view and move shared application windows (operation 242). As depicted in FIG. 2, in response to detecting movement of one or more application windows by second participant 110-2, the illustrated sequence 200 includes updating (operation 244) monitor-to-app assignments.

FIG. 2 further depicts termination operations terminating the UC session. As depicted in FIG. 2, the session termination operations include first participant 110-1 informing (operation 250) the UC client 105 to stop sharing content. The UC client responds by sending (operation 252) a close event to CSC 141. CSC 141 may respond by sending (operation 254) updated session information. The CSC 141 illustrated in FIG. 2 may then clear the view and close all shared windows (operation 256).

In this manner, the native functionality of a UC client is assisted with middleware modules that may generate parallel content streams and enable recipients to manipulate associations between shared content streams, and its own local hardware configuration, including, in particular, multi-monitor hardware configuration.

Referring now to FIG. 3, a flow diagram of a multi-monitor aware method 300 for implementing an assisted-UC session is depicted. The method 300 depicted in FIG. 3 begins when a shared content stream associated with a multi-participant unified communication (UC) session is received (operation 302). The UC session may include first and second participants corresponding to first and second information handling systems and the shared content stream may include content from two or more shared content sources shared by the first participant via the first information handling system wherein the second participant joined the UC session from a multi-monitor information handling system including a first monitor and second monitor. The multi-monitor information handling system is enabled to view (operation 304) two or more windows displaying shared content corresponding to the two or more shared content sources and move (operation 306) at least one of the two or more windows from a position on the first monitor to a position on a second monitor.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes an embedded controller EC 460 may provide or support various system management functions and, in at least some implementations, keyboard controller functions. Exemplary system management function that may be supported by EC 460 include thermal management functions supported by pulse width modulation (PWM) interfaces suitable for controlling system fans, power monitoring functions supported by an analog-to-digital (ADC) signal that can be used to monitor voltages and, in conjunction with a sense resistor, current consumption per power rail. This information could be used to, among other things, monitor battery charging or inform the user or administrator of potentially problematic power supply conditions. EC 460 may support battery management features to control charging of the battery in addition to switching between the battery and AC adapter as the active power source changes or monitoring the various battery status metrics such as temperature, charge level and overall health. EC 460 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:

receiving a shared content stream associated with a multi-participant unified communication (UC) session including first and second participants corresponding to first and second information handling systems, wherein the shared content stream includes content from two or more shared content sources shared by the first participant via the first information handling system, wherein the two or more shared content sources include a first shared content source corresponding to a first application running on the first information handling system and a second shared content source corresponding to a desktop of the first information handling system, wherein the second participant joins the UC session from a multi-monitor information handling system including a first monitor and a second monitor; and enabling the multi-monitor information handling system to:

view two or more windows displaying shared content corresponding to the two or more shared content sources; and move at least one of the two or more windows from a position on the first monitor to a position on a second monitor.

2. The method of claim 1, wherein the shared content stream includes:

first shared content corresponding to a first shared window on a first monitor of a first information handling system; and second shared content corresponding to a second shared window on a second monitor of the first information handling system.

3. The method of claim 1, wherein the multi-monitor information handling system includes collaboration assist components including:

a streaming service to stream the shared content stream to the second participant via secure web socket connections from a content sharing controller for data transfer;

the content sharing controller to receive the shared content stream and initiate data transfer; and a view manager to create multiple windows and render shared content in accordance with a request from the content sharing controller.

4. The method of claim 3, wherein the streaming service opens multiple parallel shared content streams including a shared content stream for each of two or more recipients.

5. The method of claim 4, wherein the shared content stream received by the streaming service is broadcasted to listener sockets based on the session identifier.

6. The method of claim 3, wherein the collaboration assist components execute on an electron JavaScript runtime.

7. An information handling system, including:

a central processing unit (CPU); and a system memory including processor executable instructions that, when executed by the CPU, cause the information handling system to perform operations including:

receiving a shared content stream associated with a multi-participant unified communication (UC) session including first and second participants corresponding to first and second information handling systems, wherein the shared content stream includes content from two or more shared content sources shared by the first participant via the first information handling system, wherein the two or more shared content sources include a first shared content source corresponding to a first application running on the first information handling system and a second shared content source corresponding to a desktop of the first information handling system, wherein the second participant joins the UC session from a multi-monitor information handling system including a first monitor and a second monitor; and enabling the multi-monitor information handling system to:

view two or more windows displaying shared content corresponding to the two or more shared content sources; and move at least one of the two or more windows from a position on the first monitor to a position on a second monitor.

8. The information handling system of claim 7, wherein the shared content stream includes: first shared content corresponding to a first shared window on a first monitor of a first information handling system; and second shared content corresponding to a second shared window on a second monitor of the first information handling system.

9. The information handling system of claim 1, wherein the multi-monitor information handling system includes collaboration assist components including:

a streaming service to stream the shared content stream to the second participant via secure web socket connections from a content sharing controller for data transfer;

the content sharing controller to receive the shared content stream and initiate data transfer; and a view manager to create multiple windows and render shared content in accordance with a request from the content sharing controller.

10. The information handling system of claim 9, wherein the streaming service opens multiple parallel shared content streams including a shared content stream for each of two or more recipients.

11. The information handling system of claim 10, wherein the shared content stream received by the streaming service is broadcasted to listener sockets based on the session identifier.

12. The information handling system of claim 9, wherein the collaboration assist components execute on an electron JavaScript runtime.

* * * * *